(12) United States Patent
Kim et al.

(10) Patent No.: US 12,431,123 B2
(45) Date of Patent: Sep. 30, 2025

(54) TRANSCRIPTION KNOWLEDGE GRAPH

(71) Applicant: ROKU, INC., San Jose, CA (US)

(72) Inventors: Doo Soon Kim, San Jose, CA (US); Minsuk Heo, San Jose, CA (US); Zei-Chan Yeh, Frisco, TX (US); Behnam Asefisaray, Cambridge (GB); Praful Chandra Mangalath, Sunnyvale, CA (US)

(73) Assignee: Roku, Inc., San Jose, CA (US)

( * ) Notice: Subject to any disclaimer, the term of this patent is extended or adjusted under 35 U.S.C. 154(b) by 209 days.

(21) Appl. No.: 18/332,410

(22) Filed: Jun. 9, 2023

(65) Prior Publication Data

US 2024/0412723 A1    Dec. 12, 2024

(51) Int. Cl.
*G10L 15/26*  (2006.01)
*G10L 15/02*  (2006.01)
*G10L 15/06*  (2013.01)

(52) U.S. Cl.
CPC ............ *G10L 15/063* (2013.01); *G10L 15/02* (2013.01); *G10L 15/26* (2013.01); *G10L 2015/025* (2013.01); *G10L 2015/0633* (2013.01)

(58) Field of Classification Search
None
See application file for complete search history.

(56) References Cited

U.S. PATENT DOCUMENTS 10,860,805 B1 * 12/2020 Coppersmith .......... G06F 40/40
11,620,311 B1 *  4/2023 Kumar .................. G06F 16/283
                                                         707/602

2013/0246049 A1 *  9/2013 Mirhaji ................. G06F 40/284
                                                             704/9
2016/0365092 A1 * 12/2016 Moreno Mengibar ......................
                                                         G10L 15/197
2020/0357388 A1 * 11/2020 Zhao ........................ G06N 3/08
2020/0372025 A1 * 11/2020 Yoon ...................... G06N 20/00
2021/0050004 A1 *  2/2021 Whiting ................. G10L 15/02
2021/0319066 A1 * 10/2021 Boxwell ............... G06F 40/131
2021/0335340 A1 * 10/2021 Gowayyed ............. G10L 15/02

(Continued)

OTHER PUBLICATIONS

Cui, T. et al., "An Approach to Improve Robustness of NLP Systems against ASR Errors," arXiv:2013.13610v1 [cs. CL], 9 pages, Mar. 25, 2021.

(Continued)

*Primary Examiner* — Neeraj Sharma
(74) *Attorney, Agent, or Firm* — Sterne, Kessler, Goldstein &Fox P.L.L.C.

(57) ABSTRACT

Some embodiments include a transcription knowledge graph that can resolve automatic speech recognition (ASR) engine output errors. In some embodiments, a transcription knowledge graph can utilize data from past sessions of the ASR engine to form a voice graph that can be analyzed to determine a correlation between a mis-transcription (error text) and the correct transcription (correct text). Thus, ASR engine outputs, even if they include a mis-transcription, can be adjusted to the correct transcription. Further, the correct transcriptions and the voice graph can be used to train machine learning (ML) algorithms to generate numerical representations of an entity. The ML algorithms can be applied to a transcription to correctly identify a corresponding entity label, even if the transcription was not utilized in the voice graph to train the ML algorithm.

20 Claims, 13 Drawing Sheets

(56) References Cited

U.S. PATENT DOCUMENTS

2023/0065468 A1* 3/2023 Lu .................... G10L 15/063
2024/0194188 A1* 6/2024 Weisz ................. G10L 15/22
2024/0403348 A1* 12/2024 John .................. G06F 16/358

OTHER PUBLICATIONS

Fang, A. et al., "Using Phoneme Representations to Build Predictive Models Robust to ASR Errors," SIGIR '20, Virtual Event, China, pp. 699-708, Jul. 25-30, 2020.

Tsvetkov, Y. et al., "Augmenting Translation Models with Simulated Acoustic Confusions for Improved Spoken Language Translation," Proceedings of the 14th Conference of the European Chapter of the Association for Computational Linguistics, Gothenburg, Sweden, pp. 616-625, Apr. 26-30, 2014.

Wang, H. et al., "ASR Error Correction with Augmented Transformer for Entity Retrieval," INTERSPEECH 2020, Shanghai, China, pp. 1550-1554, Oct. 25-29, 2020.

Wang, L. et al., "Data Augmentation for Training Dialog Models Robust to Speech Recognition Errors," Proceedings of the 2nd Workshop on Natural Language Processing for Conversational AI, pp. 63-70, Jul. 9, 2020.

Zhao, C. et al., "R-G2P: Evaluating and Enhancing Robustness of Grapheme to Phoneme Conversion by Controlled Noise Introducing and Contextual Information Incorporation," arXiv:2202.11194v1 [eess.AS], 5 pages, Feb. 21, 2022.

* cited by examiner

| error_text | corrected_text | freq | pmi | session ids |
|---|---|---|---|---|
| uk versus old miss | UK versus ole miss | 10 | 14.738668 | id1, id2 |
| jurassic park world domination | jurassic park world dominion | 6 | 14.661707 | id3, id4 |
| cat williams stand up comedy | katt williams stand up comedy | 6 | 14.661707 | id5 |
| evil dead too | evil dead 2 | 6 | 14.661707 | id6 |
| king chantal | kim shantal | 5 | 14.507556 | id7 |

FIG. 4C

TRANSCRIPTION KNOWLEDGE GRAPH

BACKGROUND

Field

This disclosure is generally directed to correcting output errors of conventional automatic speech recognition systems to improve accuracy and performance in real-time domains, such as but not limited to an entertainment domain.

SUMMARY

Provided herein are system, apparatus, article of manufacture, method and/or computer program product embodiments, and/or combinations and sub-combinations thereof, for a transcription knowledge graph. Some aspects include a system for a transcription knowledge graph that can receive a transcription including a media content, where the transcription is generated by an ASR engine. A transcription or transcript can be text, for example. The system can generate a voice graph based at least on previous ASR transcriptions of n-best outputs, where n is an integer, and select a candidate mined pair based at least on the voice graph, where the candidate mined pair includes a mis-transcription (e.g., an error text) and a corresponding correct transcription (e.g., the correct text). Throughout the disclosure, the terms "voice graph" and "transcription graph" may be used interchangeably. The system can determine that the transcription corresponds to the error text, and replace the error text with the correct text of the candidate mined pair.

In some aspects, the voice graph includes n nodes and at least (n−1) edges, where a first node of the n nodes corresponds to a top-1 transcript, and the nth node corresponds to the top-n transcript, where n>=2, and where the (n−1) edge of the at least (n−1) edges corresponds to the first node and the nth node. An attribute of the first node can include a frequency, a ranking distribution, and/or an associated entity. In some examples, an attribute of the (n−1) edge includes: a co-occurrence frequency of the first node and the nth node, and a relatedness score. In some examples, the relatedness score includes a pointwise mutual information (PMI) score.

The system can train a phoneme-embedding generator with a plurality of candidate mined pairs including the candidate mined pair, and generate a first vector representation of the media content using the phoneme-embedding generator. Accordingly, a candidate mined pair can be applied to an erroneous transcription that matches an error text of the candidate mined pair. By using the phoneme-embedding generator, more ASR errors can be corrected beyond the ASR errors captured in the mined pairs. In other words, the coverage of the ASR errors corrected can be extended. The system can generate a second vector representation of the transcription using the phoneme-embedding generator, and determine that the first vector representation is more similar to the second vector representation than vector representations of other media content. Based on the determination, the system can select the media content. Thus, the transcription knowledge graph system can enable selection of the media content that was included in the transcription.

In some examples, the phoneme-embedding generator can be trained with a plurality of candidate mined pairs excluding the candidate mined pair, and generate a first vector representation of the media content using the phoneme-embedding generator. The system can generate a second vector representation of the transcription using the phoneme-embedding generator, and determine that the first vector representation is more similar to the second vector representation than vector representations of other media content. Based on the determination, the system can select the media content. Thus, the transcription knowledge graph system can enable selection of the media content that was included in the transcription even when the transcription is not used in the training of the phoneme-embedding generator.

BRIEF DESCRIPTION OF THE FIGURES

The accompanying drawings are incorporated herein and form a part of the specification.

FIG. 4C illustrates an example of mined pairs, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
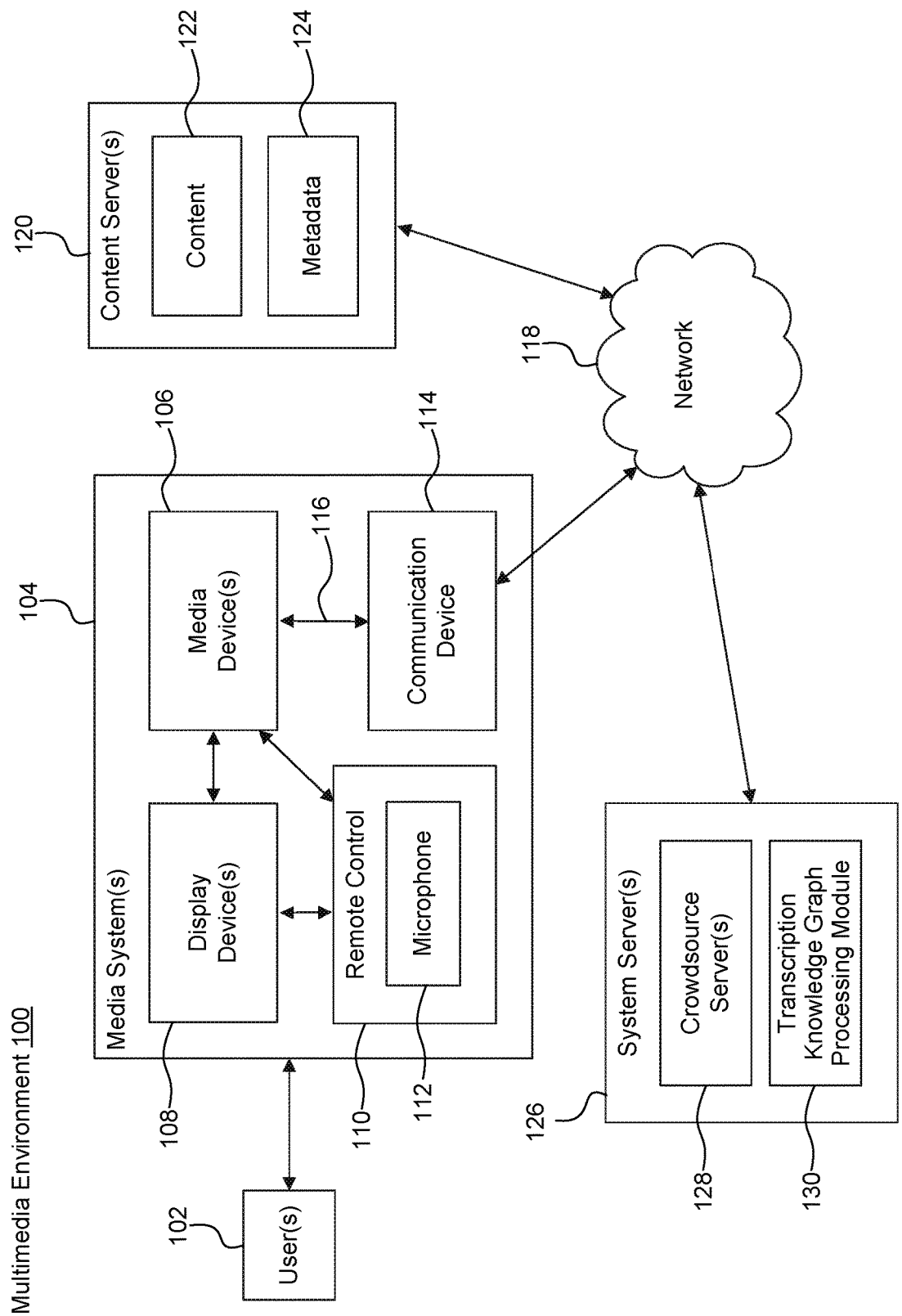
FIG. 1 illustrates a block diagram of a multimedia environment supporting a transcription knowledge graph, according to some embodiments.

Provided herein are system, apparatus, article of manufacture, method and/or computer program product embodiments, and/or combinations and sub-combinations thereof, for a transcription knowledge graph that can resolve automatic speech recognition (ASR) engine output errors such as a mis-transcription (e.g., error text.)

Speech as an input modality has become widely adopted in the media content space to provide voice-based input capability for navigating and finding media content on entertainment systems. Automatic Speech Recognition (ASR) systems have increased importance in these entertainment systems as they are responsible for recognizing speech input that involve media content. Errors may occur with ASR systems when attempting to recognize queries involving media content. These errors stem from two constraints related to ASR systems. First, they are pre-trained based on large amounts of public domain data that are available at the time of training and there is no efficient means to re-train ASR systems with new data. Second, ASR systems are generalists so that they may be implemented in a wide variety of applications. As such, conventional "off-the-shelf" ASR systems are typically trained to cover speech inputs from a broad range of speech domains having a generally known lexicon such as map/directions, application commands, weather commands, and general conversation phrases.

There are different types of speech domains. Static domains are those where the entities (e.g., the words or phrasing) to be recognized generally stay the same from when the ASR was trained, such as weather commands (e.g., "What's the weather today") or application commands (e.g., "Text Sarah"; "I'll be home in 10 minutes"). Already trained or pre-configured ASR systems are therefore suitable for static domains to handle static entities.

Dynamic domains present a challenge. In contrast to static domains, dynamic domains are constantly evolving because these domains involve the introduction of new words, unique words, and unexpected pronunciations. Dynamic domains have constant and rapid release cycles and also can include live content (e.g., user-generated content) for which an ASR system cannot be trained before implementation. One example of a dynamic content domain is the entertainment domain which includes media content from popular culture where new content may be created and uploaded on a daily, even hourly, basis. Proliferation of user-upload sites where users and entertainment companies alike may upload video content has democratized the creation process for media content. Another example of the challenges in the media domain includes music artist names, many of which have unique pronunciations. A generic off-the-shelf ASR engine may not be able to recognize those unique pronunciations unless the ASR engine is constantly updated to recognize them.

The fast-paced released cycle of such content means that the content and associated audio data are an on-going reflection of popular culture's ever evolving parlance and slang. Because they are trained and preconfigured prior to implementation, conventional ASR systems have difficulty with dynamic content domains where the new entertainment entities can involve these new pronunciations. Domain mismatch occurs when conventional ASR systems process speech inputs that require searching entities in dynamic domains. Speech recognition capability in dynamic domains are therefore hampered by conventional ASR systems.

For example, in a voice assistant system that includes an ASR engine, the ASR output that includes a mis-transcription (e.g., error text) can cause malfunctions in the downstream functions. The malfunctions can be a source of negative user experiences with voice assistant systems. Often, off-the-shelf ASR engines (e.g., cloud ASR services) are used for voice applications, and changing an ASR engine in those cases is difficult. Even if training data and source codes were made available, new training data (e.g., new pairs of (human voice, transcript)) would be needed and the new training data is time-consuming to collect. Further, adding new training data may have an unexpected harmful effect on the performance of previously successful ASR engine outputs.

In some aspects, a transcription knowledge graph system can include a voice graph automatic speech recognition (ASR) error correction module and/or a natural language understanding (NLU) system that includes a phoneme-embedding module. The voice graph ASR correction module can utilize a voice graph to correct ASR output errors in a first transcription. The phoneme-embedding module can utilize portions of the voice graph ASR correction module to train a machine learning (ML) embedding model to produce a numeric representation of the first transcription such as a vector of the phonetic representation. The ML embedding model can be applied to dynamic domains including but not limited to entities (e.g., songs, movie titles, actors, phrases etc.) to create corresponding numeric phonetic representations of the entities that can be saved in an entity embedding database. The phoneme-embedding module can use the numeric representation of the first transcription and the numeric phonetic representations of the entities to determine the entity that is most similar to the first transcription. The phoneme-embedding module can determine the entity most similar to the first transcription when the first transcription is a part of training data to train the ML embedding model (memorization process). The phone embedding module can determine the entity most similar to the first transcription even when the first transcription is not used to train the ML embedding model as part of a generalization process.

In other words, the ML embedding model can be trained to perform a generalization process, not just a memorization process, such that the first transcription sounding phonetically similar to an entity in the entity embedding database can be linked with the entity. Thus, the correct entity that is numerically similar to the first transcription can be determined and retrieved, even if the first transcription is an ASR mis-transcription.

The transcription knowledge graph system can adapt to correct new ASR mis-transcriptions (e.g., new error texts) over time, and can train the ML embedding model to work in dynamic domains and accommodate new entities (e.g., new movies, audio books, authors) based on the adaptations. Accordingly, corresponding correct entities can be determined and retrieved based on ASR outputs of correct transcriptions or mis-transcriptions.

The ML embedding model training (e.g., algorithm training) can be performed without supervision, and can result in lower costs to implement since human intervention is not required. The embodiments can work with any ASR engine, and since the ASR error correction occurs after the ASR engine process, the embodiments do not require a modification to an ASR engine. Further, the embodiments can be applied in any locale and is therefore, a multi-lingual approach. Accordingly, the embodiments can not only provide ASR error correction, but improve entity selection based on continuous improvements to an ML embedding model.

Various embodiments of this disclosure may be implemented using and/or may be part of a multimedia environment 100 shown in FIG. 1. It is noted, however, that multimedia environment 100 is provided solely for illustrative purposes, and is not limiting. Embodiments of this disclosure may be implemented using and/or may be part of environments different from and/or in addition to the multimedia environment 100, as will be appreciated by persons skilled in the relevant art(s) based on the teachings contained herein. An example of the multimedia environment 100 shall now be described.

Also, the embodiments of this disclosure are applicable to any voice responsive devices, not just those related to entertainment systems such as multimedia environment 100. Such voice responsive devices include digital assistants, smart phones and tablets, appliances, automobiles and other vehicles, and Internet of Things (IoT) devices, to name just some examples.

Multimedia Environment

FIG. 1 illustrates block diagram 100 of a multimedia environment supporting a transcription knowledge graph, according to some embodiments. In a non-limiting example, multimedia environment 100 may be directed a system for processing audio commands involving streaming media. However, this disclosure is applicable to any type of media (instead of or in addition to streaming media), as well as any mechanism, means, protocol, method and/or process for distributing media where audio commands may be processed in order to request media.

The multimedia environment 100 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 102 may operate with the media system 104 to select and consume media content by, for example, providing audio commands to request media content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, a sound bar, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, where the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, system and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. In an embodiment, the remote control 110 may be integrated into media device 106 or display device 108. The remote control 110 may include a microphone 112, which is further described below.

Any device in media system 104 may be capable of receiving and processing audio commands from user(s) 102. Such devices may be referred to herein as audio or voice responsive devices, and/or voice input devices. One or more system servers 126 may include a transcription knowledge graph processing module 130. Any one of media device 106, display device 108, or remote control 110, however, may include a transcription knowledge graph processing module 130 that receives audio commands requesting media content, processes the audio commands, and performs actions for correcting, retrieving, and providing the requested media content to media system 104. In an embodiment, microphone 112 may also be integrated into media device 106 or display device 108, thereby enabling media device 106 or display device 108 to receive audio commands directly from user 102. Additional components and operations of transcription knowledge graph processing module 130 are described further below with regard to FIGS. 2, 3, 4A, 4B, 5A-5C, 6, and 7 below. While transcription knowledge graph processing module 130 may be implemented in each device in media system 104, in practice, transcription knowledge graph processing modules 130 may also be implemented as a single module within one of media device 106, display device 108, and/or remote control 110.

The multimedia environment 100 may include a plurality of content servers 120 (also called content providers or sources). Although only one content server 120 is shown in FIG. 1, in practice the multimedia environment 100 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 100 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 102 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming sessions of the movie.

The system servers 126 may also include a domain adapted audio command processing module 130. FIG. 1 depicts domain adapted audio command processing module 130 implemented in media device 106, display device 108, remote control 110, and system server 126, respectively. In practice, domain adapted audio command processing modules 130 may be implemented as a single module within just one of media device 106, display device 108, remote control 110, or system server 126, or in a distributed manner as shown in FIG. 1.

As noted above, the remote control 110 may include a microphone 112. The microphone 112 may receive spoken audio data from users 102 (as well as other sources, such as the display device 108). As noted above, the media device 106 may be audio responsive, and the audio data may represent audio commands (e.g., "Play a movie," "search for a movie") from the user 102 to control the media device 106 as well as other components in the media system 104, such as the display device 108.

In some embodiments, the audio data received by the microphone 112 in the remote control 110 is processed by the device in which the transcription knowledge graph processing module 130 is implemented (e.g., media device 106, display device 108, remote control 110, and/or system server 126). For example, in an embodiment where the transcription knowledge graph processing module 130 is implemented in media device 106, audio data may be received by the media device 106 from remote control 110. The transfer of audio data may occur over a wireless link between remote control 110 and media device 106. Also or alternatively, where voice command functionality is integrated within display device 108, display device 108 may receive the audio data directly from user 102.

The transcription knowledge graph processing module 130 that receives the audio data may operate to process and analyze the received audio data to recognize the user 102's audio command. The transcription knowledge graph processing module 130 may then perform an action associated with the audio command such as identifying potential candidates associated with the requested media content, forming a system command for retrieving the requested media content, and/or displaying the requested media content on the display device 108.

As noted above, the system servers 126 may also include the transcription knowledge graph processing module 130. In an embodiment, media device 106 may transfer audio data to the system servers 126 for processing using the domain adapted audio command processing module 130 in the system servers 126.

Figure 2:
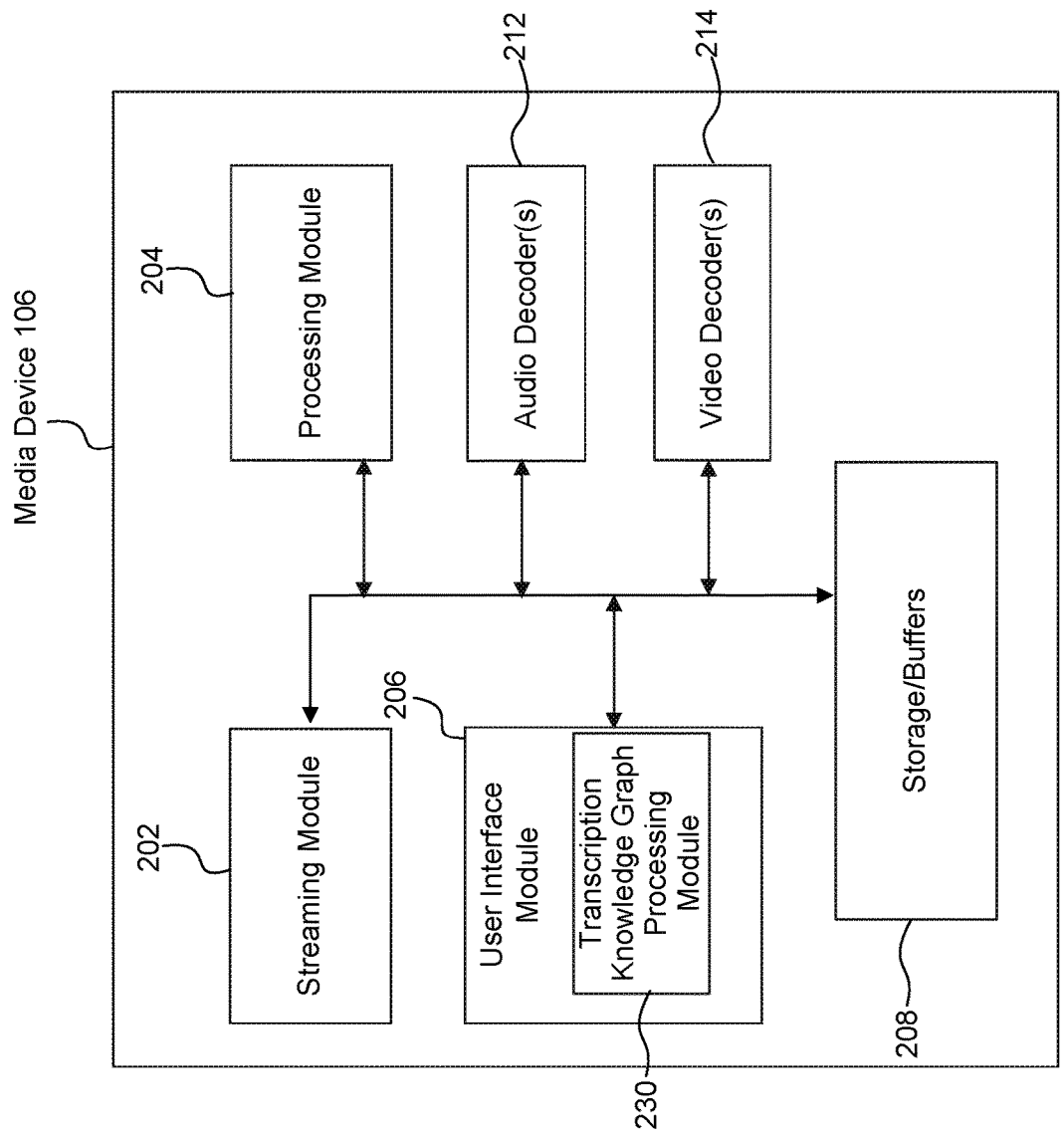
FIG. 2 illustrates a block diagram of an example media device supporting a transcription knowledge graph, according to some embodiments.

FIG. 2 illustrates a block diagram of an example media device 106, supporting a transcription knowledge graph according to some embodiments. Media device 106 may include a streaming module 202, processing module 204, storage/buffers 208, and user interface module 206. As described above, the user interface module 206 may include the transcription knowledge graph processing module 230.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 102 may interact with the media device 106 via, for example, the remote control 110. As noted above, remote control 110 may be implemented separately from media device 106 or integrated within media device 106. For example, the user 102 may use the remote control 110 to verbally interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 102.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Transcription Knowledge Graph Processing

Referring to FIG. 1, the transcription knowledge graph processing module 130 may be implemented within any device of media system 104 and may be configured to process audio data received from user 102. The transcription knowledge graph processing module 130 supports processing audio commands and can resolve automatic speech recognition (ASR) engine output errors. For example, when a user provides audio input, an ASR engine analyzes the audio input, recognizes the speech, and outputs a transcript, such as the text corresponding to the audio input. In this disclosure, text, transcript, and transcription may be used interchangeably. In addition, error text or mis-transcription may be used interchangeably. If a user said "jurassic park world dominion" as audio input, an ASR engine may incorrectly recognize the input to produce "jurassic park world domination" where "domination" is an error text, also called a mis-transcription. In some cases, the ASR engine has a difficult time recognizing the speech because the user may have an accent, and/or the ASR engine does not expect that combination of words resulting in an error text.

Transcription knowledge graph processing module 130 can utilize data from past sessions of the ASR engine to form a voice graph that can be analyzed to determine a correlation between a mis-transcription (error text) and the correct transcription (correct text). Thus, ASR engine outputs, even if they include a mis-transcription, can be adjusted to the correct transcription. Further, the voice graph can be used to train machine learning (ML) embedded model algorithms to generate numerical representations of an entity. The term "entity" can refer to specific content of media content such as a movie, song, or television show, etc. The entity may be associated with different types of metadata including but not limited to movie titles, actor names, music artists, titles of media content including user-generated content, and popular phrases (e.g., lyrics from songs, dialogue from movies). The ML embedding model algorithms can be applied to a transcription to correctly identify a corresponding entity label, even if the transcription was not utilized in the voice graph to train the ML embedding model algorithms.

Figure 3:
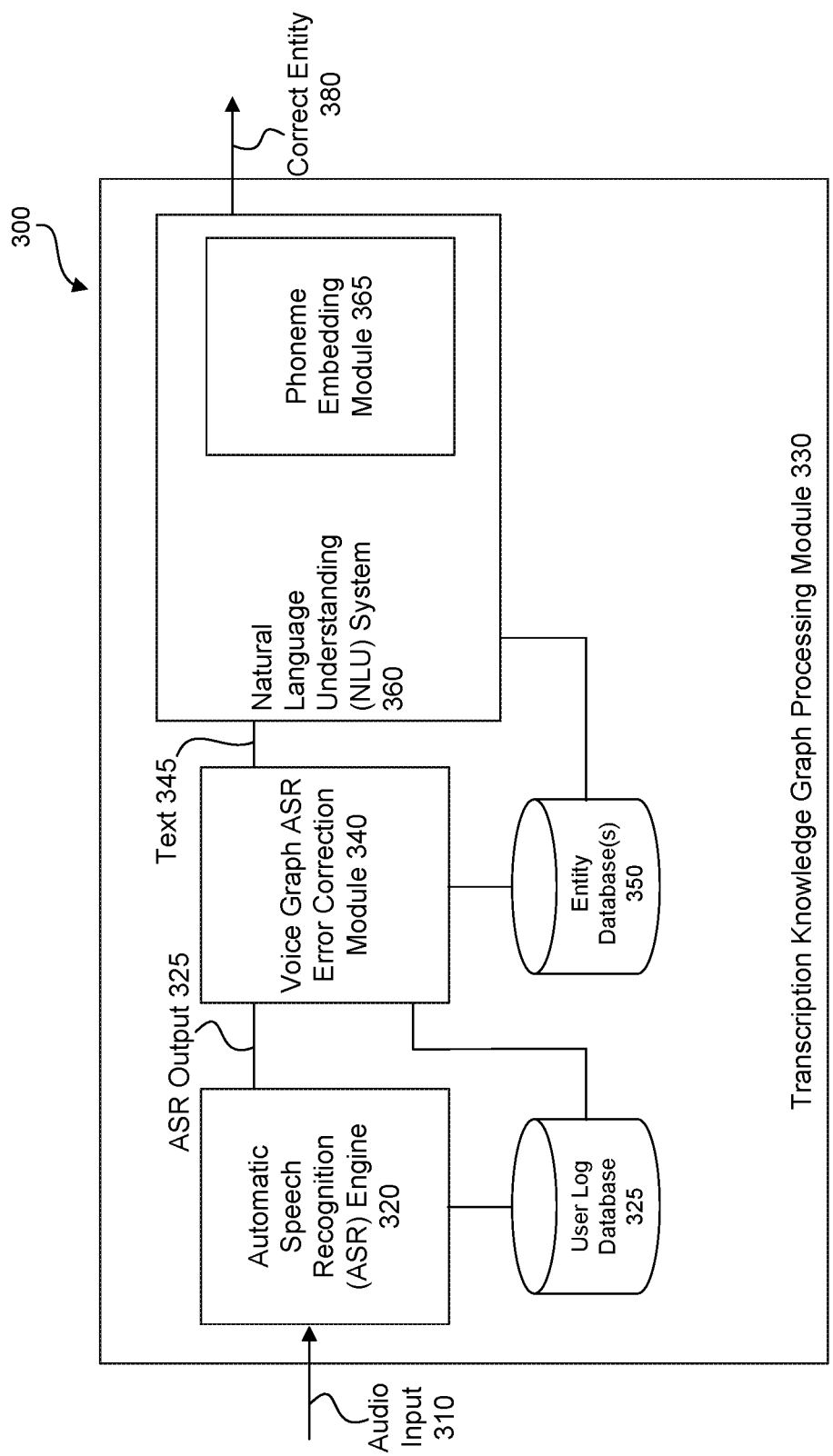
FIG. 3 illustrates a block diagram of a transcription knowledge graph processing module, according to some embodiments.

FIG. 3 illustrates block diagram 300 of a transcription knowledge graph processing module 330, according to some embodiments. For explanation purposes and not a limitation, FIG. 3 may be described with reference to elements from FIG. 1 and/or FIG. 2. For example, transcription knowledge graph processing module 330 may refer to transcription knowledge graph processing module 130 of FIG. 1 or transcription knowledge graph processing module 230 of FIG. 2. Transcription knowledge graph processing module 330 may include ASR engine 320, user log database 325, voice graph ASR error correction module 340, entity database 350, and natural language understanding (NLU) system 360. NLU system 360 may include phoneme-embedding module 365.

Information generated by ASR engine 320 from a session can be stored in in user log database 325 such as the n-best outputs for a session that identifies the possible transcriptions and corresponding scores, where n is an integer. Entity database(s) 350 can include one or more databases corresponding to entities as described above (e.g., movie titles, music titles, actor names, music artists, titles of media content including user-generated content, and/or popular phrases.) NLU system 360 receives transcriptions, interprets the meaning of the transcriptions, and provides information accordingly. For example, if the transcription included text that matched a movie title, NLU system 360 can produce the movie title corresponding to the text.

Block diagram 300 illustrates audio input 310 being received by ASR engine 320. The audio input may be from user 102 speaking to media system 104 as shown in FIG. 1. ASR engine 320 can generate ASR output 325 that includes a transcription that may be a mis-transcription (e.g., error text) or a correct transcription (e.g., correct text.) Voice graph ASR error correction module 340 can access user log database 325 and entity database(s) 350 to determine mined pairs where a mined pair includes an error text and the corresponding correct text (e.g., (error text, correct text).) Voice graph ASR error correction module 340 can receive ASR output 325 and utilize the mined pairs to correct any mis-transcriptions in ASR output 325 to produce text 345. Correct text can also be referred to as a correct transcription.

Phoneme-embedding module 365 can utilize the mined pairs and the entity database(s) 350 to determine a numerical representation of an entity or entity label. NLU system 360 can receive text 345, and use phoneme-embedding module 365 to determine a numerical representation of text 345. NLU system 360 can analyze the numerical representations of entities, and select the entity whose numerical representation is closest or most similar to the numerical representation of text 345. NLU system 360 can output the selected entity as correct entity 380.

Figure 4A:
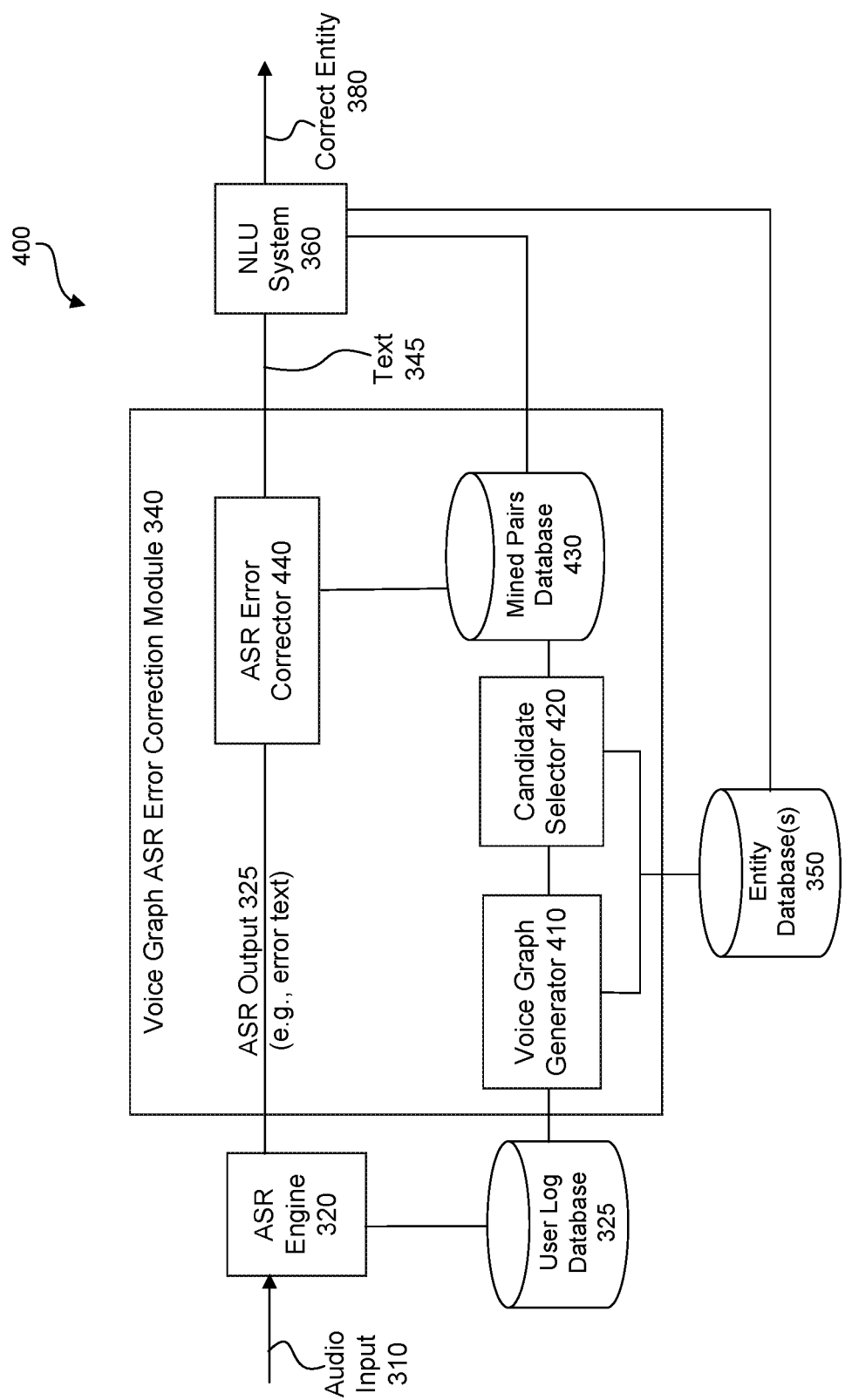
FIG. 4A illustrates a block diagram including a voice graph automatic speech recognition (ASR) error correction module, according to some embodiments.

FIG. 4A illustrates block diagram 400 including voice graph ASR error correction module 340, according to some embodiments. For explanation purposes and not a limitation, FIG. 4A may be described with reference to elements from FIGS. 1-3. In FIG. 4A, voice graph ASR error correction module 340 can build a voice graph, a data structure, from a user production log (e.g., user log database 325.) The voice graph can be a graph of ASR transcripts where nodes represent transcripts and edges represent a co-occurrence within the same sessions in the ASR n-best outputs in the user production log. Voice graph ASR error correction module 340 can apply several criteria to the voice graph to select mined pairs (mis-transcription, correct transcription). In other words, the mined pairs are highly likely correlations between a mis-transcription and a correct transcription. In real production, (e.g., ASR output 325), the mined pairs can be used by voice graph ASR error correction module 340 to replace potential ASR mis-transcriptions of ASR output 325 with the correct transcription. For example, when a transcript of ASR output 325 matches a mis-transcription corresponding to a mined pair, voice graph ASR error correction module 340 can select (e.g., replace) the correct transcription of the mined pair as the transcript of text 345.

Voice graph ASR error correction module 340 may include voice graph generator 410, candidate selector 420, mined pairs database 430, and ASR error corrector 440. Voice graph generator 410 can access user log database 325 and build a voice graph. Candidate selector 420 can utilize the voice graph to select mined pairs (e.g., (error text, correct text)), and the mined pairs can be stored in mined pairs database 430. The mined pairs can be stored as (correct text, error text). ASR error corrector 440 can receive ASR output 325 that can include a mis-transcription (e.g., an error text.) ASR error corrector 440 can access mined pairs database 430 and determine whether the ASR output 325 includes a mis-transcription. If a mis-transcription is determined, ASR error corrector 440 can replace the mis-transcription in text 345 with the correct transcription, and provide text 345 to NLU system 360.

Building a Voice Graph

ASR engine 320 can receive audio input 310 and produce ASR output 325. In addition, ASR engine 320 can output the processing results from various sessions that can be stored in user log database 325. A session can identify a number, n, of the best (n-best) outputs from ASR engine 320, where n is an integer. In practice, a user log can include many sessions and the n-best outputs can be large (e.g., millions to billions of sessions per day.)

Figure 4B:
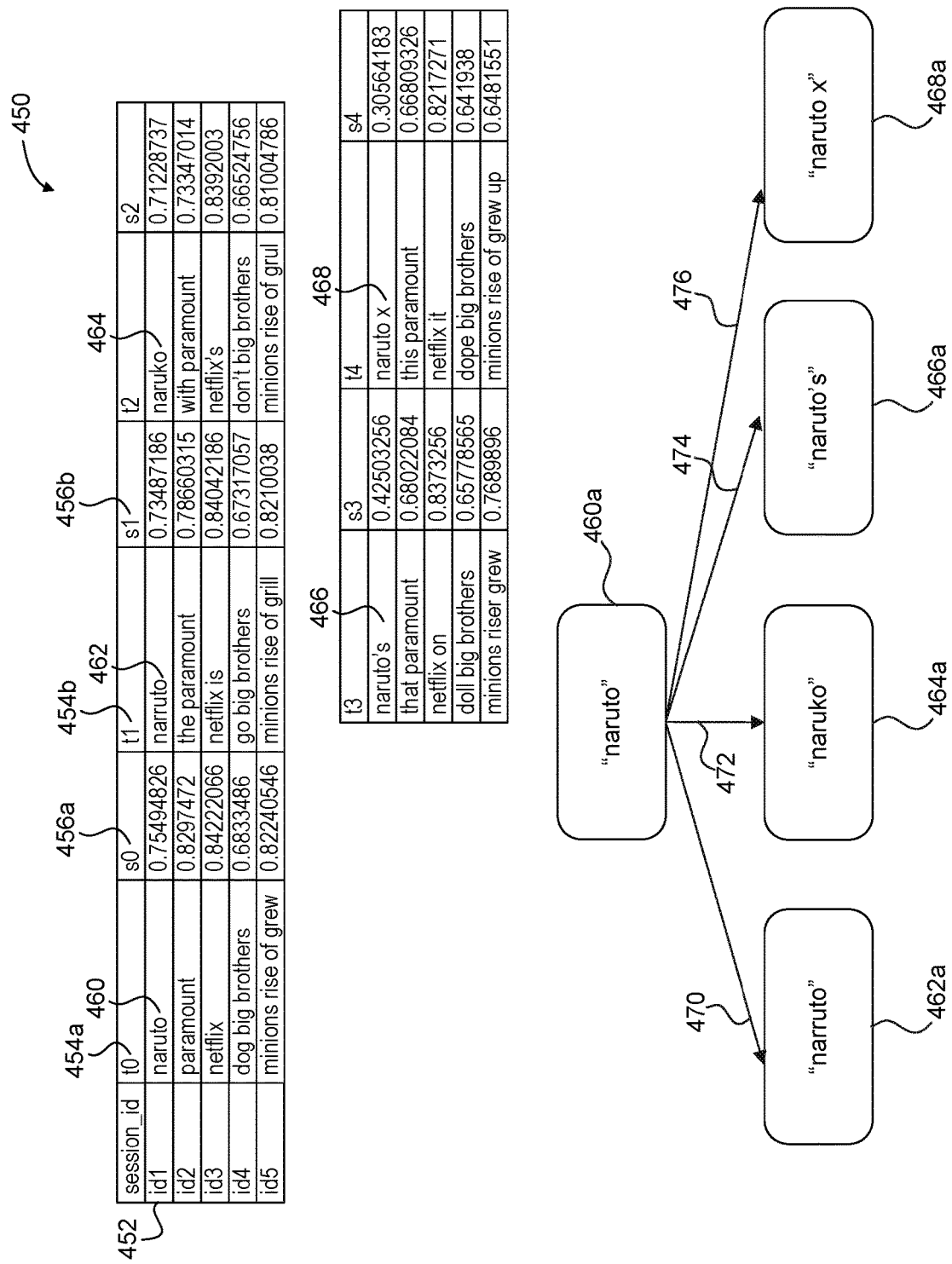
FIG. 4B illustrates an example of a user log and a corresponding voice graph, according to some embodiments.

FIG. 4B illustrates example 450 of a user log and a corresponding voice graph, according to some embodiments. For explanation purposes and not a limitation, FIG. 4B may be described with reference to elements from FIGS. 1-3. In example 450, n=5 and the 5-best outputs are shown as the highest or top transcription in column t0 454a, the next highest transcriptions are shown in column t1 454b, followed by t2, t3, and t4. A transcript may also have a corresponding ASR confidence score shown in an adjacent column that indicates a value that ASR engine 320 generated corresponding to the transcript, and the transcripts may be ranked based at least on their respective ASR confidence scores. Example 450 includes 5 sessions of user log database 325 shown as rows id1-id5 and a total of 25 transcripts. The first session identified as id1 452, corresponds to the first row. The first session starts with a top transcription, t0, naruto 460, in column t0 454a, followed by a corresponding top ASR confidence score, s0, of 0.75494826 in column s0 456a. The second highest transcription, t1, narruto 462, with a corresponding ASR confidence score, s1, of 0.73487186 shown in column s1 456b. The first session continues with the next highest transcription, t2, naruko 464, corresponding ASR confidence score, s2, next highest transcription, t3, naruto's 466, corresponding ASR confidence score, s3, and ends with the transcription, t4, as naruto x 468, and corresponding ASR confidence score, s4, of 0.30564183.

Voice graph generator 410 can access user log database 325 and use the information as input to generate a voice graph based on the ASR transcriptions including the ASR n-best outputs. One voice graph can be generated from all the sessions in user log database 325. Note that even if a same transcript occurs multiple times throughout user log database 325, only one node is generated in a voice graph. The attributes of the node would contain the aggregated statistics of those multiple occurrences e.g., frequency of occurrence, ranking distribution, etc. A voice graph corresponding to the first session, id1, is shown with the following nodes naruto 460a, narruto 462a, naruko 464a, naruto's 466a, and naruto x 468a. Voice graph generator 410 can associate the top node (e.g., naruto 460a) with the other nodes with edges that represent the co-occurrence in the ASR n-best outputs of user log database 325. An edge can represent (top1 transcript, top-n transcript) where n>=2. For example, top node naruto 460a is associated with narruto 462a with edge 470. Top node naruto 460a is associated with naruko 464a shown as edge 472. Top node naruto 460a is associated with naruto's 466a shown as edge 474, and top node naruto 460a is associated with naruto x 468a shown as edge 476. While example 450 illustrates 5 sessions and 4 edges, it is understood that there may be many sessions. For example, occurrence of transcription "naruto" and any of the other transcriptions above (e.g., "naruto x") may occur in other sessions (not shown). In some examples, there may be one or more edges between a top node (e.g., naruto 460a) and another node (e.g., naruto x 468a) that are not shown.

Voice graph generator 410 can determine metadata or attributes for the nodes and edges based on session information in user log database 325. A node can include the following attributes: a frequency, a ranking distribution, a session, and an entity linked as shown in Table 1 below. The frequency can correspond to a number of times (e.g., a number of sessions) in which a transcript (e.g., "naruto") appears in user log database 325. The ranking distribution can indicate the rankings corresponding to the frequencies. For example, a ranking distribution for the transcript "naruto" of (9, 3, 2) can indicate that the transcript occurred 9 times as the top1, 3 times as the top2, and 2 times as the top3 occurrence in different sessions. When a transcript (e.g., "naruto") occurs many times as the top1 output transcription compared to "naruto x" that does not occur as a top1 output transcription, the ranking distribution provides insight that "naruto" is more likely to be a correct transcription than a mis-transcription. And, naruto x 468a is more likely to be a mis-transcription than a correct transcription. The session attribute may be used for analysis and debugging the algorithms used for building the voice graph. The entity/entities linked can be entities that correspond to a string match of an entity in entity database(s) 350. The entities linked can be determined by voice graph generator 410, candidate selector 420, and/or an entity linker (e.g., entity linker 530 of FIG. 5) that performs a string match to retrieve a linked entity. If a match is determined, the match can provide strong evidence that a transcript (e.g., "naruto") is a correct transcription. Conversely, if no match occurs for a transcript (e.g., "naruto x"), that may indicate that "naruto x" is likely a mis-transcription.

TABLE 1

Node Attribute Examples

| Node Attributes | Description |
|---|---|
| Frequency | Frequency of a transcript's occurrence in user log database |
| Ranking distribution | Histogram of transcript's ranking (e.g., (9, 3, 2) meaning that the transcript occurred 9 times as the top1, 3 times as the top2, and 2 times as the top3 occurrence in different sessions |
| Session | Session ids |
| Entities linked | Entity referred by a transcript. For example, a simple string match can be used to detect an associated entity |

In some aspects, an edge can include the following attributes: a co-occurrence frequency and a relatedness score as shown in Table 2 below. The co-occurrence frequency can indicate how often two transcriptions occur together in the same sessions in user log database 325. The relatedness score can measure how related two transcripts are to each other. In example 450, based on the attributes of the nodes and the edges calculated, voice graph generator 410 can associate the nodes with the top node (e.g., naruto 460a).

TABLE 2

Edge Attribute Examples

| Edge Attributes | Description |
|---|---|
| Co-occurrence frequency | Frequency of two transcripts co-occurring together in user log database |
| Relatedness score | A measure of how related two transcripts are to each other. An example of relatedness includes pointwise mutual information (PMI) score. Other examples are possible |

An example of a relatedness score is a pointwise mutual information (PMI) score. Other examples are possible. The PMI score can be used as a proxy to measure the relatedness between two transcripts, x, y shown by the equation below:

$$pmi(x, y) = \log_2 \frac{N_{xy} * N_{total}}{N_x * N_y}$$

where $N_x$, $N_y$ represent the frequency of the occurrences of x and y, $N_{xy}$ represents the number of co-occurrences of (x, y), and $N_{total}$ represents the sum of the frequencies of all the transcripts.

Select Candidate Mined Pairs

Voice graph ASR error correction module 340 can utilize the voice graph to select pairs of transcripts as mined pairs. In other words, voice graph ASR error correction module 340 can use the voice graph (e.g., example 450) to determine pairs of correct text and error text (correct text, error text)

also referred to as (correct transcription, mis-transcription). In some examples, a mined pair can include (error text, correct text).

Candidate selector 420 can analyze the various nodes, and/or edges in a voice graph to select a candidate edge (x, y) as a mined pair (correct text, error text). In example 450, a mined pair can include (naruto 460a, naruto's 466a.) An edge (x, y) can be selected as (correct text, error text) based at least on a PMI score of the edge satisfying a first threshold value (TH1), a top1 score of the correct text satisfying a second threshold value (TH2), a top1 score of the error text satisfying a third threshold value (TH3), and/or the error text not being linked with an entity (e.g., the error text is not linked any entity in entity database(s) 350.) For example, edge (x, y) 474 can be selected as a mined pair (naruto 460a, naruto's 466a) if the following conditions are met:

PMI score>=TH1;

Top1 score of x>=TH2, where the top1 score is a normalized score derived from the ranking distribution;

Top1 score of y<=TH3, where the top1 score is a normalized score derived from the ranking distribution; and y is not linked with an entity.

In some aspects, the threshold values are hyper-parameters. In other words, the threshold values TH1, TH2, and/or TH3 control the machine learning (ML) embedding model process for selecting candidates of mined pairs. In some examples, the threshold values are as follows: TH1=10; TH2=0.7; and TH3=0.3

Correcting an ASR Mis-Transcription Using Mined Pairs

ASR error corrector 440 can receive ASR output 325 that includes a mis-transcription (e.g., naruto's 466a). ASR error corrector 440 can access mined pairs database 430 and determine that a mined pair includes the (correct text, error text) of (naruto 460a, naruto's 466a). Given that naruto's 466a in ASR output 325 matches the error text of the mined pair, ASR error corrector 440 can select naruto 460a as the correct text. Accordingly, ASR corrector 440 can transmit "naruto" as the transcript of text 345.

FIG. 4C illustrates example 480 of mined pairs, according to some embodiments. For explanation purposes and not a limitation, FIG. 4C may be described with reference to elements from FIGS. 1-3. Example 480 illustrates mined pairs (error_text 482, corrected_text 484) and the following data: a frequency 486 that represents a frequency of occurrences of the error text as a top1 transcript during a mining time window); a PMI score 488 of the relatedness between the error_text and corrected_text; and the session identifiers 490 include the sessions in which the error_text and corrected_text co-occur together. Based on example 480, if ASR output 325 included "uk versus old miss", ASR error corrector 440 can update the transcription to produce "UK verses ole miss" as the transcription of text 345. In another example, if ASR output 325 included "jurrassic park world domination," ASR error corrector 440 can update the transcription to produce "jurrassic park world dominion" as the transcription of text 345.

Figure 5A:
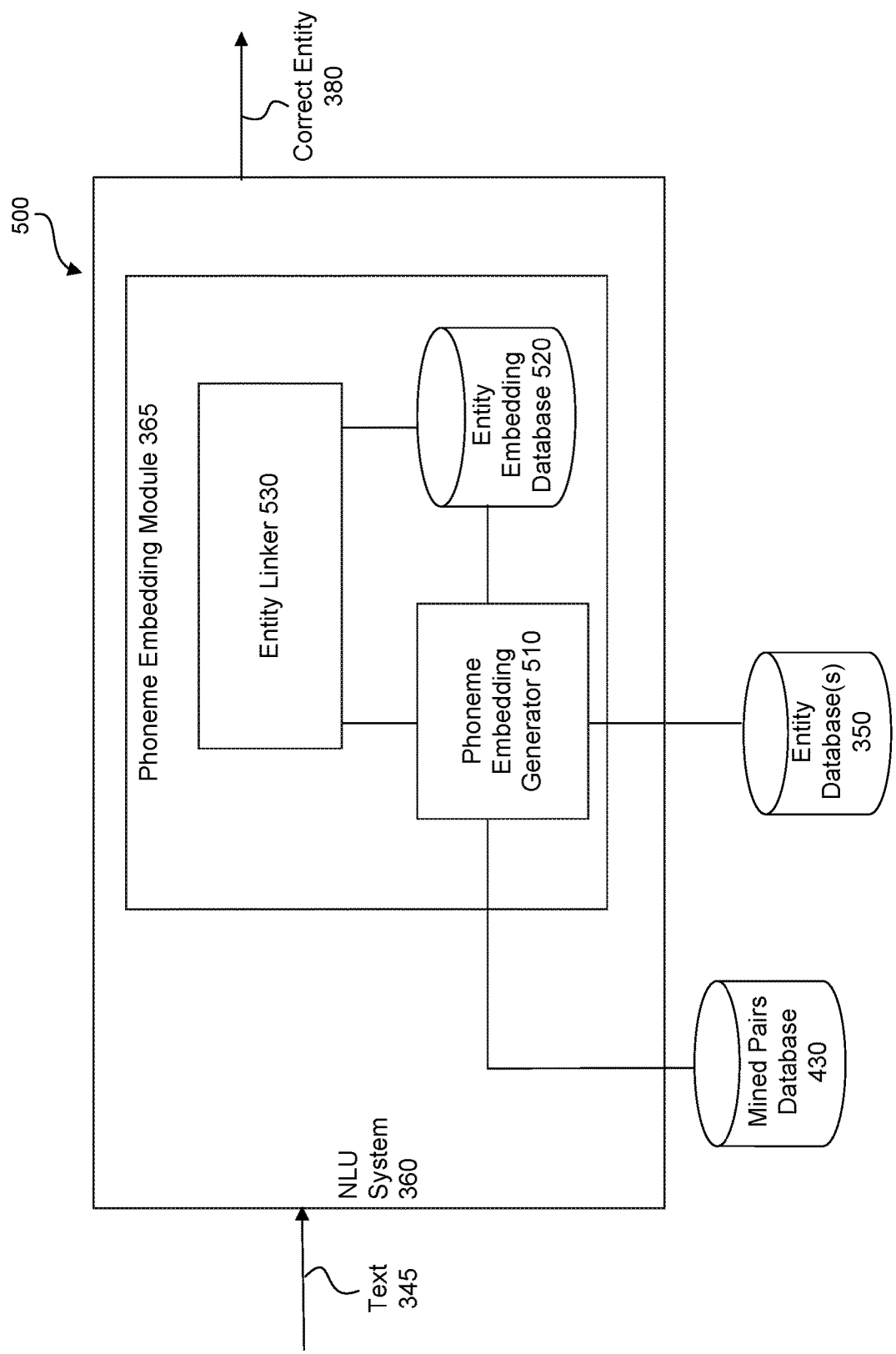
FIG. 5A illustrates a block diagram of a natural language understanding (NLU) system including a phoneme-embedding module, according to some embodiments.

FIG. 5A illustrates block diagram 500 of natural language understanding (NLU) system 360 including phoneme-embedding module 365, according to some embodiments. For explanation purposes and not a limitation, FIG. 5A may be described with reference to elements from other figures in the disclosure. Phoneme-embedding module 365 can generate a ML embedding model that is trained using the mined pairs in mined pairs database 430 to produce a numeric representation of a transcript (e.g., a vector for the phonetic representation of a transcript.) In some aspects, the ML embedding model (e.g., ML embedding algorithms) can be trained such that transcripts sounding phonetically similar are assigned similar vector representations. Phoneme-embedding module 365 can include phoneme-embedding generator 510, embedding database 520, and entity linker 530. Phoneme-embedding generator 510 may include one or more algorithms that access mined pairs of mined pairs database 430 and train an ML embedding model of phoneme-embedding generator 510. For example, an algorithm can take the error text of an (error text, correct text) mining pair as input, and train the ML embedding model which produces similar vector representations for the transcripts that are phonetically-similar. Thus, the ML embedding model can learn from phonetic correlations of the mined pairs and learn the phonetic similarities over time.

Figure 5B:
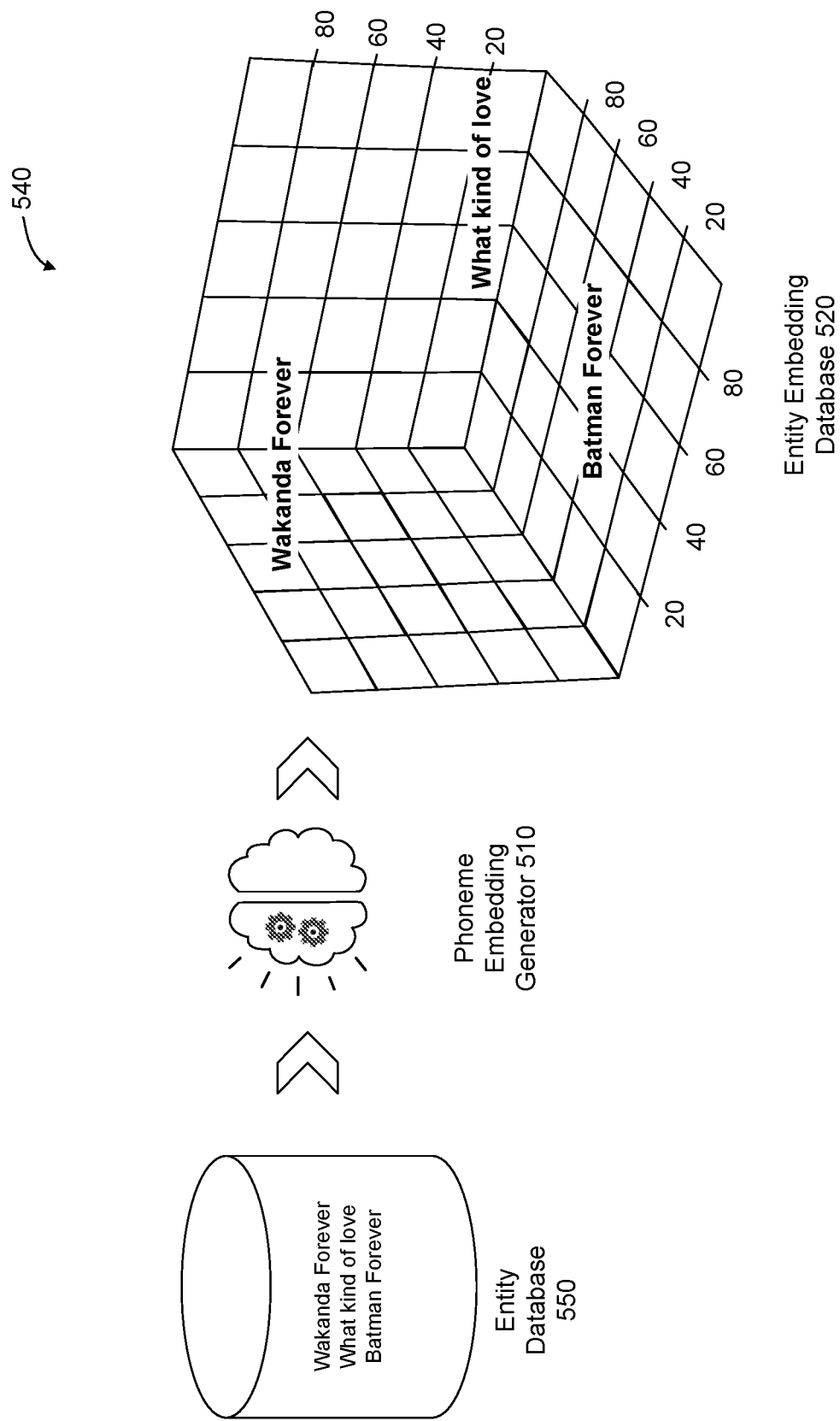
FIG. 5B illustrates an example of a phoneme-embedding module, according to some embodiments.

FIG. 5B illustrates example 540 of phoneme-embedding module 365, according to some embodiments. For explanation purposes and not a limitation, FIG. 5B may be described with reference to elements from other figures in the disclosure. For example, entity database 550 can be the same as entity database(s) 350. Entity database 550 may include movie labels including but not limited to Wakanda Forever, What Kind of Love, and Batman Forever. Phoneme-embedding generator 510 can take an entity (e.g., Wakanda Forever) as input, apply the ML embedding model, and generate a vector for the phonetic representation of a transcript (e.g., Wakanda Forever.) The vector for the phonetic representation of Wakanda Forever can be stored in an embedding space in entity embedding database 520. Phonetically similar alternatives are closely located in the embedding space in entity embedding database 520. Phoneme-embedding generator 510 can take What Kind of Love as input, apply the ML embedding model trained from the mined pairs database 430, and generate a vector for the phonetic representation of What Kind of Love shown in entity embedding database 520. Accordingly, vectors for the phonetic representations of Wakanda Forever, What Kind of Love, and Batman Forever can be stored in the embedding space in entity embedding database 520.

In some aspects, text 345 received by NLU system 360 may include the transcription inserted by ASR error corrector 440 using the mined pairs database 430. Entity linker 530 can receive text 345 (that could include a mis-transcription that is not included in mined pairs database 430), and use phoneme-embedding generator 510 to generate a vector for the phonetic representation of the transcription. Entity linker 530 can compare the vector for the phonetic representation of the transcription with vectors in entity embedding database 520, and when a match is found, entity linker 530 can select the matched entity as correct entity 380. For example, as described above, if ASR output 325 included "jurrassic park world domination" 494 of FIG. 4C, ASR error corrector 440 can use the mined pair and correct the mis-transcription to make "jurrassic park world dominion" be the transcript of text 345. Thus, entity linker 530 can use phoneme-embedding generator 510 to generate a vector for the phonetic representation of "jurrassic park world dominion." When entity linker 530 compares the vector for the phonetic representation of "jurrassic park world dominion" with vectors in entity embedding database 520, entity linker 530 can find a match and produce "jurrassic park world dominion" as correct entity 380. In this example, the success is based on a memorization process because "jurrassic park world dominion" was part of a mined pair on which the ML embedding model of phoneme-embedding generator 510 was trained. Phoneme-embedding generator 510 can also utilize a generalization process when a transcript is not part of a mined pair of mined pairs database 430 on which the ML embedding model of phoneme-embedding generator 510 is trained.

Figure 5C:
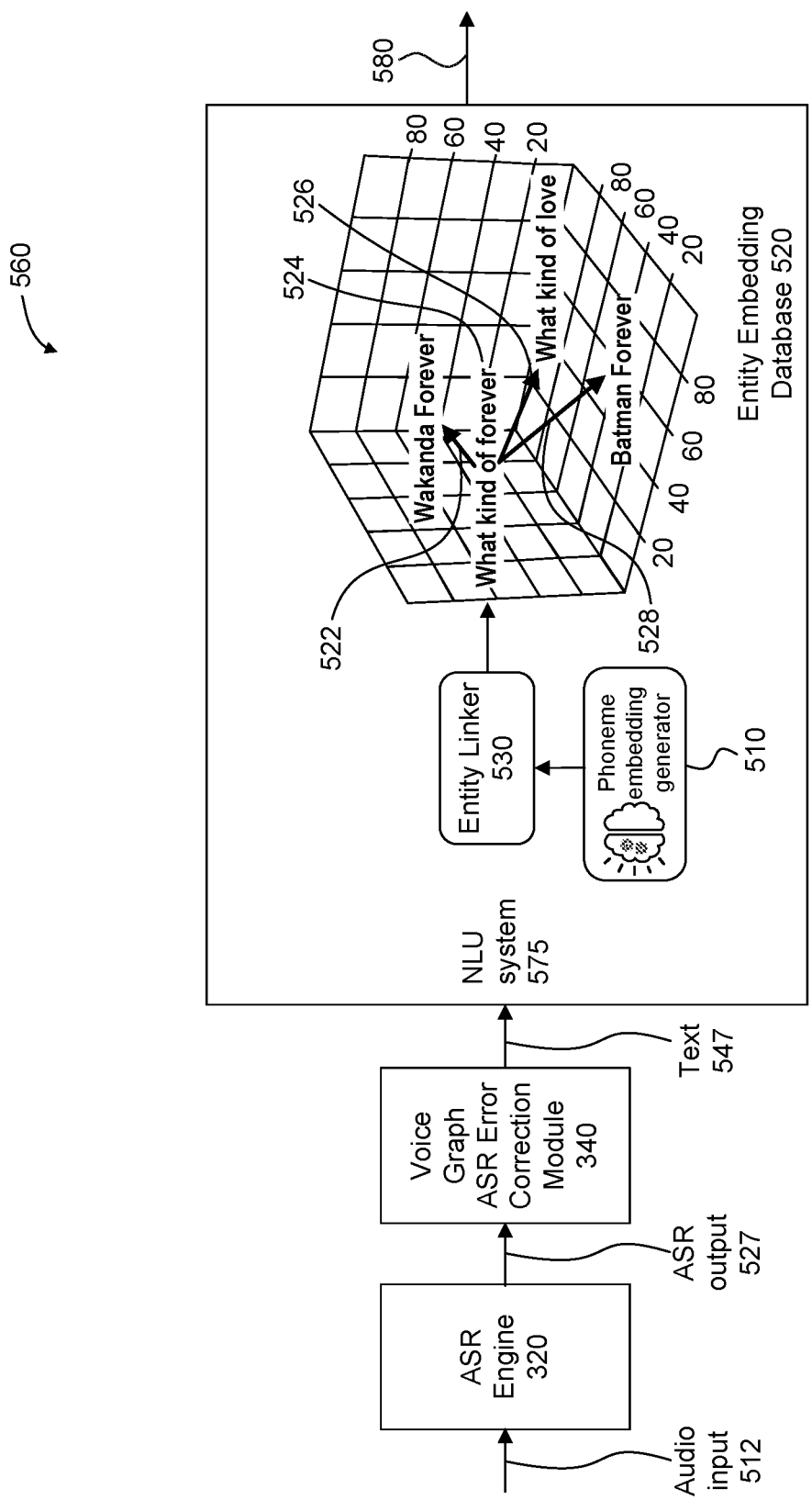
FIG. 5C illustrates an example of a phoneme-embedding module including a generalization process, according to some embodiments.

FIG. 5C illustrates example 560 of a phoneme-embedding module including a generalization process, according to some embodiments. For explanation purposes and not a limitation, FIG. 5C may be described with reference to elements from other figures in the disclosure. For example, audio input 512, ASR output 527, and text 547 may be audio input 310, ASR output 325, and text 345 of FIGS. 3 and 4A. In example 560, ASR output 527 may be the transcription, "what kind of forever," that does not match any mined pairs in mined pairs database 430. Accordingly, NLU system 575 may receive text 547 that includes the transcription, "what kind of forever." Entity linker 530 can utilize phoneme-embedding generator 510 that includes the trained ML embedding model that generated vector 522 for the phonetic representation of Wakanda Forever, vector 526 for the phonetic representation of What Kind of Love, and vector 528 for the phonetic representation of Batman Forever. Entity linker 530 can utilize the trained ML embedding model of phoneme-embedding generator 510 to generate vector 524 for the phonetic representation of "what kind of forever" even though "what kind of forever" was not an error text or correct text of a mined pair in mined pairs database 430. Entity linker 530 can analyze vector 524 with other vectors in the entity space of entity embedding database 520 and determine that vector 522 for the phonetic representation of Wakanda Forever is the closest numerical representation of an entity to vector 524 for the phonetic representation of "what kind of forever." The analysis may include a vector similarity metric (e.g., a cosine similarity metric.) Thus, entity linker 530 can select Wakanda Forever as the intended entity, and produce Wakanda Forever as the correct entity 580.

Figure 9:
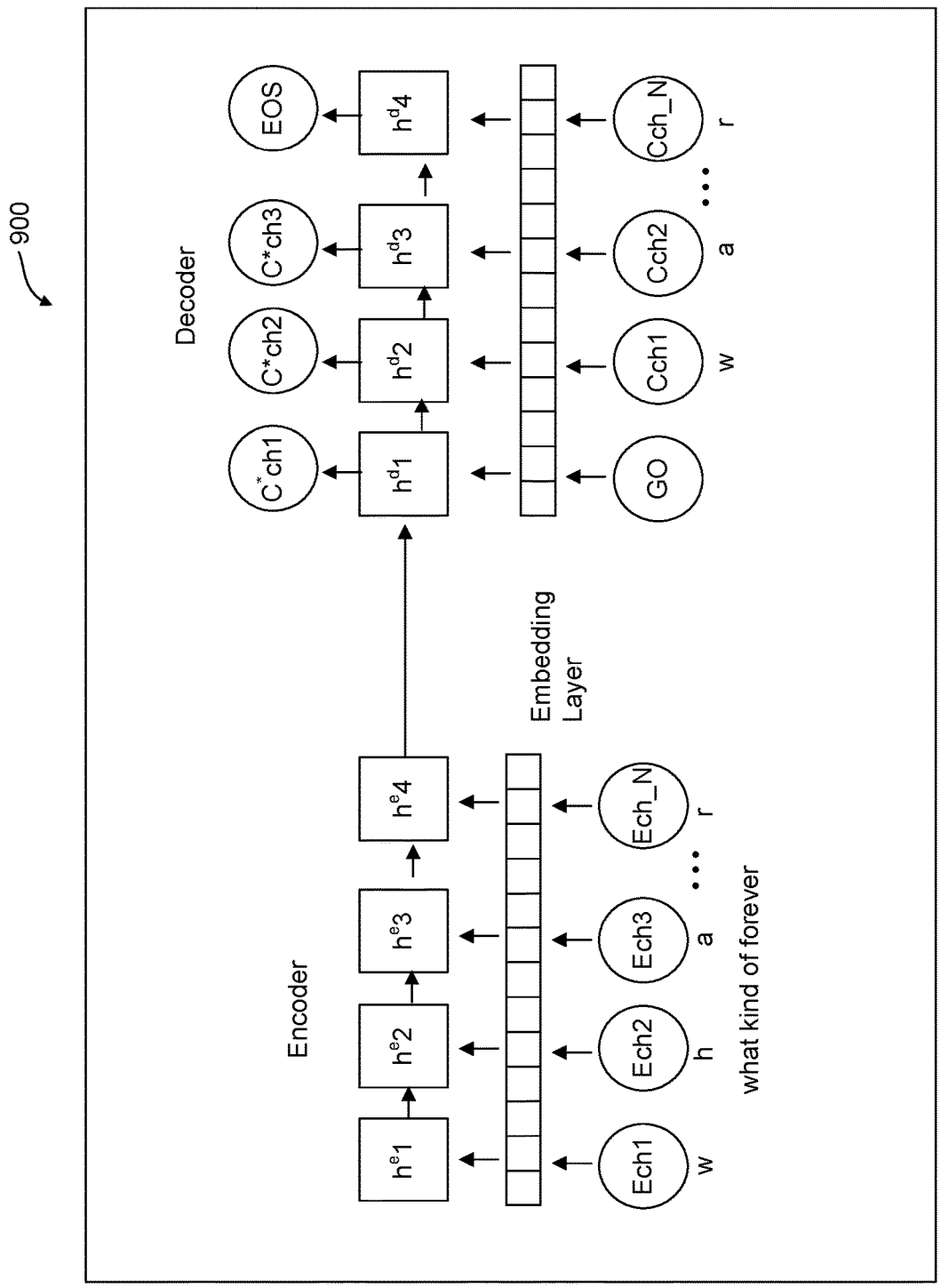
FIG. 9 illustrates an example of a training process for a phoneme-embedding generator, according to some embodiments.

FIG. 9 illustrates example 900 of a training process for phoneme-embedding generator 510, according to some embodiments. For explanation purposes and not a limitation, FIG. 9 may be described with reference to elements from other figures in the disclosure. A training algorithm for phoneme-embedding generator 510 could be a seq-to-seq model where the input error text (e.g., "jurassic park world domination") is converted into the output correct text (e.g., "jurassic park world dominion"). Once trained, the embedding layer is taken as the phoneme-embedding generator. Thus, as new entities are created and new mined pairs are developed, the ML embedding model can adapt accordingly to more accurately select the intended entity as the correct entity than if the ML embedding model did not have access to the mined pairs database. The ML embedding model can be used in a generalization process even if a transcription is not part of a mined pairs database.

Example 900 illustrates a training process of the ML embedding model when a transcript of text 547 is not found in mined pairs database 430. The model shown in FIG. 9 is called a "seq-to-seq" model where phoneme embedding generator 510 is only a part of the seq-to-seq model. Using the mined candidate pairs, the seq-to-seq model can be trained by treating the error text as an input text and the correct text as an output text. Once trained, the embedding layer can be extracted from the seq-to-seq model to be used as phoneme embedding generator 510. For example, text 547 can include the transcript, "what kind of forever," and the ML embedding model trained from mined pairs can produce a corresponding transcript that phoneme-embedding generator 510 and/or entity linker 530 can use to generate vector 524 for the phonetic representation of "what kind of forever." Thus, the ML embedding model is not limited to a memorization process. Rather, the ML embedding model can be applied to transcripts not found in mined pairs database 430 to perform a generalization process as well. As described above in example 560, entity linker 530 can determine that vector 524 for the transcript "what kind of forever" is most similar to vector 522 for the entity "Wakanda Forever" and select "Wakanda Forever" as correct entity 580.

Figure 6:
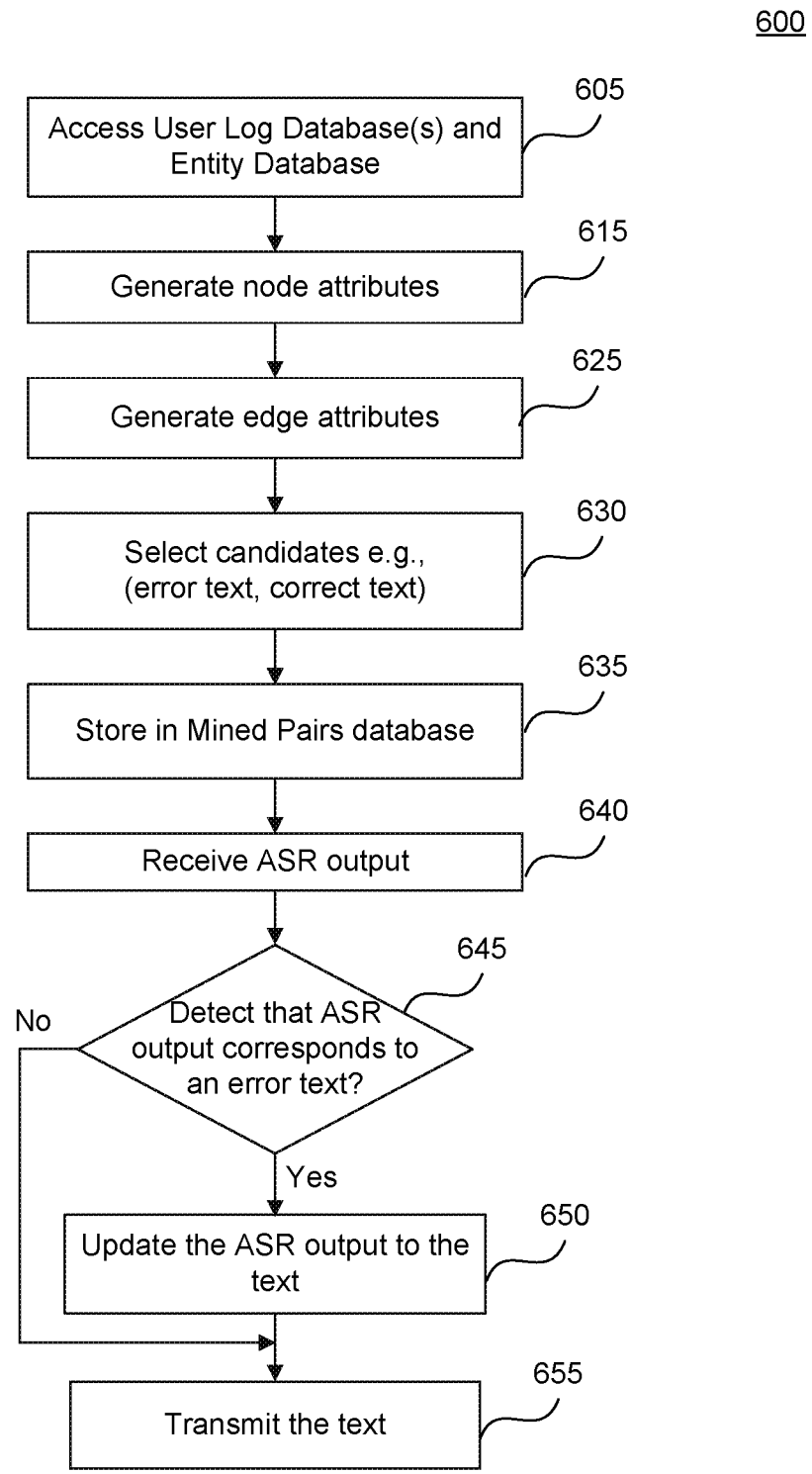
FIG. 6 illustrates a flowchart for a method for a voice graph ASR error correction module, according to some embodiments.

FIG. 6 illustrates a flowchart for a method 600 for voice graph ASR error correction module 340, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 4A. However, method 600 is not limited to that example embodiment.

In step 605, ASR correction module 340 can access user log database 325 and entity database(s) 350. For example, voice graph generator 410 can access user log database 325 to build a voice graph.

In step 615, ASR correction module 340 can begin building a voice graph. Voice graph generator 410 can generate node attributes for the transcripts (e.g., t0, t1, t2, etc.) based on sessions of user log database 325. The node attributes can include a frequency, a ranking distribution, a session identifier, and/or entities linked as shown in Table 1.

In step 625 ASR correction module 340 can generate edge attributes for edges between two transcriptions. For example, voice graph generator 410 can determine relatedness between two transcriptions, and calculate a relatedness score such as a PMI score to determine the relatedness between transcripts of a session as shown in Table 2.

In step 630, ASR correction module 340 can select candidate mined pairs (e.g., (error text, correct text).) For example, candidate selector 420 can access entity database(s) 350, and based on the node and/or edge attributes of the voice graph, select candidate mined pairs of error text and correct text.

In step 635, ASR correction module 340 can store the selected candidate mined pairs in mined pairs database 430. For example, candidate selector 420 can store the selected candidate mined pairs in mined pairs database 430.

In step 640, ASR correction module 340 can receive ASR output from an ASR engine. For example, ASR error corrector 440 can receive a transcript in ASR output 325 from ASR engine 320.

In step 645, ASR correction module 340 can decide whether the ASR output corresponds to an error text. For example, ASR error corrector 440 can compare the transcription in ASR output 325 with mined pairs in mined pairs database 430. If a match is found with an error text, then method 600 proceeds to 650. Otherwise, method 600 proceeds to 655.

In step 650, ASR correction module 340 can update the transcription of ASR output to correct text. For example, ASR error corrector 440 can update the transcription from ASR output 325 to the correct text of the mined pair corresponding to the error text.

In step 655, ASR correction module 340 can transmit the correct text. For example, ASR error corrector 440 can transmit the correct text of the mined pair as the transcript in text 345.

Figure 7:
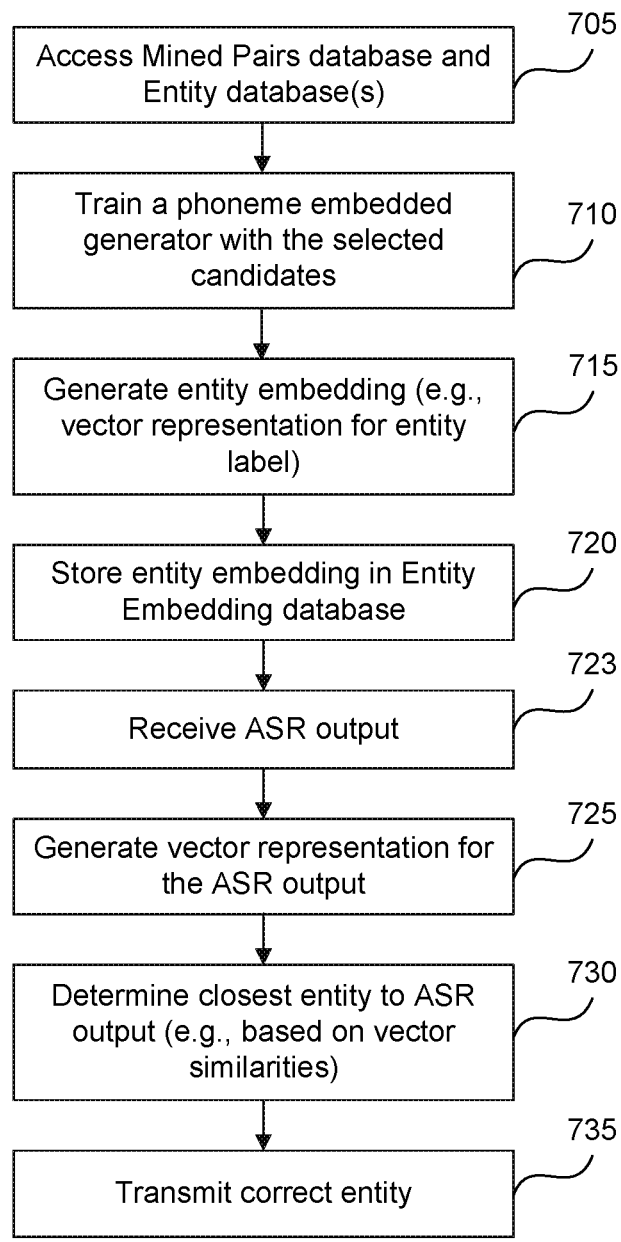
FIG. 7 illustrates a method for an NLU system including a phoneme-embedding module, according to some embodiments.

FIG. 7 illustrates a flowchart for a method for NLU system 360 including phoneme embedding module 365, according to some embodiments. For explanation purposes and not a limitation, FIG. 7 may be described with reference to elements from other figures in the disclosure.

FIG. 7 is a flowchart for a method 700 for NLU system 360 including phoneme embedding module 365, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 5A. However, method 700 is not limited to that example embodiment.

In step 705, phoneme embedding module 365 can access mined pairs database 430 and entity database(s) 350.

In step 710, phoneme embedding module 365 can train phoneme embedded generator 510 with the selected candidates. For example, phoneme embedded generator 510 can access mined pairs of mined pairs database 430 and train a ML embedding model to recognize the phonetic similarities between an error text and a correct text of a mined pair.

In step 715, phoneme embedding module 365 can generate entity embedding (e.g., a vector representation for an entity). For example, phoneme embedding generator 510 can access an entity of entity database(s) 350 and apply the trained ML embedding model to generate a numeric representation (e.g., a vector) for the phonetic representation of the entity.

In step 720, phoneme embedding module 365 can store entity embedding in entity embedding database 520. For example, phoneme embedding generator 510 can store the vector for the phonetic representation of the entity in entity embedding database 520. Phoneme embedding generator 510 can populate entity embedding database 520 with the generated numeric representations corresponding to one or more of the entities of entity database(s) 350.

In step 723, phoneme embedding module 365 can receive ASR output. For example, entity linker 530 can receive a transcript of text 345 (that can include a mis-transcription.)

In step 725, phoneme embedding module 365 can generate a vector for the ASR output such as a transcription of text 345 (that can include a mis-transcription.) For example, entity linker 530 can cause phoneme embedding generator 510 to apply the ML embedding model to the transcription of text 345 to generate a vector for the phonetic representation of text 345. In some examples, the transcription of text 345 is not included in mined pairs database 430, and phoneme embedding generator 510 performs a generalization process using the ML embedding model to generate the vector for the phonetic representation of text 345.

In step 730, phoneme embedding module 365 can determine a closest entity to the transcription of text 345. For example, entity linker can analyze the vector for the text 345 with vectors for the phonetic representation of entities in entity embedding database 520, and select a closest vector as the correct entity 380.

In step 735, phoneme embedding module 365 can transmit or select the correct entity. For example, entity linker 530 can produce the selected closest vector as correct entity 380.

Example Computer System

Figure 8:
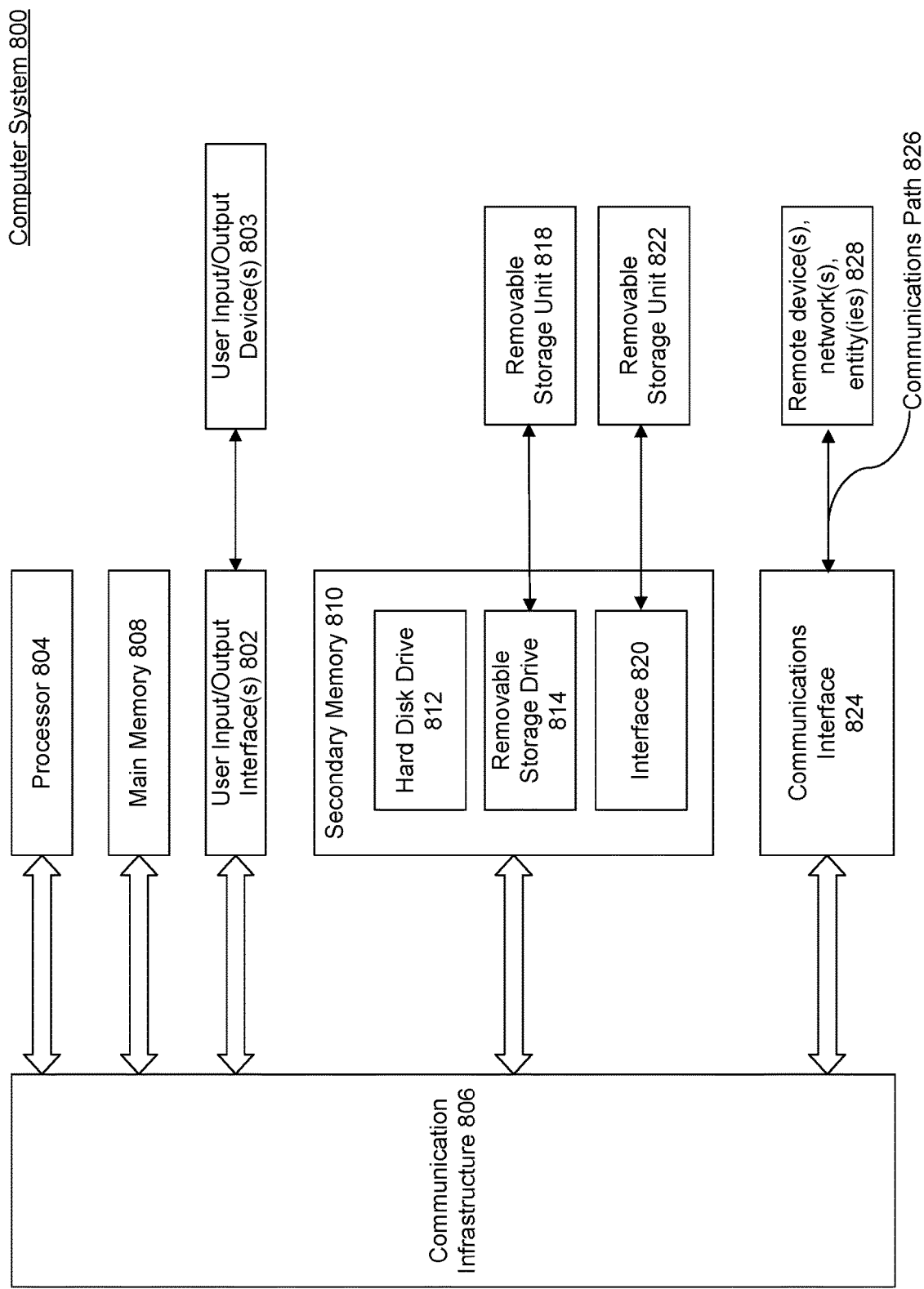
FIG. 8 illustrates an example computer system useful for implementing various embodiments.

Various embodiments and/or components therein can be implemented, for example, using one or more computer systems, such as computer system 800 shown in FIG. 8. Computer system 800 can be any computer or computing device capable of performing the functions described herein. For example, the media device 106 may be implemented using combinations or sub-combinations of computer system 800. Also or alternatively, one or more computer systems 800 may be used to implement any of the embodiments discussed herein, as well as combinations and sub-combinations thereof.

Computer system 800 includes one or more processors (also called central processing units, or CPUs), such as processor 804. Processor 804 is connected to communications infrastructure 806 (e.g., a bus).

In some embodiments, processor 804 can be a graphics processing unit (GPU). In some embodiments, a GPU may be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communications infrastructure 806 through user input/output interface(s) 802.

Computer system 800 also includes main memory 808 (e.g., a primary memory or storage device), such as random access memory (RAM). Main memory 808 can include one or more levels of cache. Main memory 808 may have stored therein control logic (i.e., computer software) and/or data.

Computer system 800 can also include one or more secondary storage devices or memories such as secondary memory 810. Secondary memory 810 can include, for example, hard disk drive 812, removable storage drive 814 (e.g., a removable storage device), or both. Removable storage drive 814 can be a floppy disk drive, a magnetic tape drive, a compact disk drive, an optical storage device, tape backup device, and/or any other storage device/drive.

Removable storage drive 814 can interact with removable storage unit 818. Removable storage unit 818 includes a computer usable or readable storage device having stored thereon computer software (e.g., control logic) and/or data. Removable storage unit 818 can be a floppy disk, magnetic tape, compact disk, DVD, optical storage disk, and/any other computer data storage device. Removable storage drive 814 may read from and/or write to removable storage unit 818.

In some embodiments, secondary memory 810 can include other means, devices, components, instrumentalities or other approaches for allowing computer programs and/or other instructions and/or data to be accessed by computer system 800. Such means, devices, components, instrumentalities or other approaches can include, for example, removable storage unit 822 and interface 820. Examples of removable storage unit 822 and interface 820 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 can further include a communications interface 824 (e.g., a network interface). Communications interface 824 may enable computer system 800 to communicate and interact with any combination of external or remote devices, external or remote networks, remote entities, etc. (individually and collectively referenced by reference number 828). For example, communications interface 824 can allow computer system 800 to communicate with external or remote devices 828 over communications path 826, which can be wired, wireless, or a combination thereof, and which can include any combination of LANs, WANs, the Internet, etc. Control logic and/or data can be transmitted to and from computer system 800 via communications path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards and specifications associated with images, audio, video, streaming (e.g., adaptive bitrate (ABR) streaming, content feeds), high-dynamic-range (HDR) video, text (e.g., closed captioning, subtitles), metadata (e.g., content metadata), data interchange, data serialization, data markup, digital rights management (DRM), encryption, any other suitable function or purpose, or any combination thereof. Alternatively, proprietary data structures, formats or schemas may be used, either exclusively or in combination with another standard or specification.

Standards and specifications associated with images may include, but are not limited to, Base Index Frames (BIF), Bitmap (BMP), Graphical Interchange Format (GIF), Joint Photographic Experts Group (JPEG or JPG), Portable Network Graphics (PNG), any other suitable techniques (e.g., functionally similar representations), any predecessors, successors, and variants thereof, and any combinations thereof.

Standards and specifications associated with audio may include, but are not limited to, Advanced Audio Coding (AAC), AAC High Efficiency (AAC-HE), AAC Low Complexity (AAC-LC), Apple Lossless Audio Codec (ALAC), Audio Data Transport Stream (ADTS), Audio Interchange File Format (AIFF), Digital Theater Systems (DTS), DTS Express (DTSE), Dolby Digital (DD or AC3), Dolby Digital Plus (DD+ or Enhanced AC3 (EAC3)), Dolby AC4, Dolby Atmos, Dolby Multistream (MS12), Free Lossless Audio Codec (FLAC), Linear Pulse Code Modulation (LPCM or PCM), Matroska Audio (MKA), Moving Picture Experts Group (MPEG)-1 Part 3 and MPEG-2 Part 3 (MP3), MPEG-4 Audio (e.g., MP4A or M4A), Ogg, Ogg with Vorbis audio (Ogg Vorbis), Opus, Vorbis, Waveform Audio File Format (WAVE or WAV), Windows Media Audio (WMA), any other suitable techniques, any predecessors, successors, and variants thereof, and any combinations thereof.

Standards and specifications associated with video may include, but are not limited to, Alliance for Open Media (AOMedia) Video 1 (AV1), Audio Video Interleave (AVI), Matroska Video (MKV), MPEG-4 Part 10 Advanced Video Coding (AVC or H.264), MPEG-4 Part 14 (MP4), MPEG-4 Video (e.g., MP4V or M4V), MPEG-H Part 2 High Efficiency Video Coding (HEVC or H.265), QuickTime File Format (QTFF or MOV), VP8, VP9, WebM, Windows Media Video (WMV), any other suitable techniques, any predecessors, successors, and variants thereof, and any combinations thereof.

Standards and specifications associated with streaming may include, but are not limited to, Adaptive Streaming over HTTP, Common Media Application Format (CMAF), Direct Publisher JavaScript Object Notation (JSON), HD Adaptive Streaming, HTTP Dynamic Streaming, HTTP Live Streaming (HLS), HTTP Secure (HTTPS), Hypertext Transfer Protocol (HTTP), Internet Information Services (IIS) Smooth Streaming (SMOOTH), Media RSS (MRSS), MPEG Dynamic Adaptive Streaming over HTTP (MPEG-DASH or DASH), MPEG transport stream (MPEG-TS or TS), Protected Interoperable File Format (PIFF), Scalable HEVC (SHVC), any other suitable techniques, any predecessors, successors, and variants thereof, and any combinations thereof.

Standards and specifications associated with HDR video may include, but are not limited to, Dolby Vision, HDR10 Media Profile (HDR10), HDR10 Plus (HDR10+), Hybrid Log-Gamma (HLG), Perceptual Quantizer (PQ), SL-HDR1, any other suitable techniques, any predecessors, successors, and variants thereof, and any combinations thereof.

Standards and specifications associated with text, metadata, data interchange, data serialization, and data markup may include, but are not limited to, Internet Information Services (IIS) Smooth Streaming Manifest (ISM), IIS Smooth Streaming Text (ISMT), Matroska Subtitles (MKS), SubRip (SRT), Timed Text Markup Language (TTML), Web Video Text Tracks (WebVTT or WVTT), Comma-Separated Values (CSV), Extensible Markup Language (XML), Extensible Hypertext Markup Language (XHTML), XML User Interface Language (XUL), JSON, MessagePack, Wireless Markup Language (WML), Yet Another Markup Language (YAML), any other suitable techniques, any predecessors, successors, and variants thereof, and any combinations thereof.

Standards and specifications associated with DRM and encryption may include, but are not limited to, Advanced Encryption Standard (AES) (e.g., AES-128, AES-192, AES-256), Blowfish (BF), Cipher Block Chaining (CBC), Cipher Feedback (CFB), Counter (CTR), Data Encryption Standard (DES), Triple DES (3DES), Electronic Codebook (ECB), FairPlay, Galois Message Authentication Code (GMAC), Galois/Counter Mode (GCM), High-bandwidth Digital Content Protection (HDCP), Output Feedback (OFB), PlayReady, Propagating CBC (PCBC), Trusted Execution Environment (TEE), Verimatrix, Widevine, any other suitable techniques, any predecessors, successors, and variants thereof, and any combinations thereof, such as AES-CBC encryption (CBCS), AES-CTR encryption (CENC).

In some embodiments, a tangible, non-transitory system or article of manufacture including a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer-implemented method for correcting automatic speech recognition (ASR) engine output, comprising:
   receiving, by at least one computer processor, a transcription comprising media content, wherein the transcription is generated via an ASR engine;
   generating a voice graph based at least on previous ASR transcriptions of n-best outputs, where n is an integer, wherein the voice graph comprises n nodes and at least (n−1) edges, wherein a first node of the n nodes corresponds to a top-1 transcript, and an $n^{th}$ node corresponds to a top-n transcript, where n>=2, and wherein an (n−1) edge of the at least (n−1) edges corresponds to the first node and the $n^{th}$ node;
   selecting a candidate mined pair based at least on the voice graph, wherein the candidate mined pair comprises a mis-transcription and a correct transcription;
   determining that the transcription corresponds to the mis-transcription; and
   replacing the transcription with the correct transcription.

2. The computer-implemented method of claim 1, wherein an attribute of the first node comprises: a frequency, a ranking distribution, or an associated entity.

3. The computer-implemented method of claim 1, wherein an attribute of the (n−1) edge comprises: a co-occurrence frequency of the first node and the $n^{th}$ node, and a relatedness score.

4. The computer-implemented method of claim 3, wherein the relatedness score comprises a pointwise mutual information (PMI) score.

5. The computer-implemented method of claim 1, further comprising:
   training a phoneme embedding generator with a plurality of candidate mined pairs including the candidate mined pair; and
   generating a first vector representation of the media content using the phoneme embedding generator.

6. The computer-implemented method of claim 5, further comprising:
   generating a second vector representation of the transcription using the phoneme embedding generator;
   determining that the first vector representation is more similar to the second vector representation than vector representations of other media content; and
   selecting the media content, responsive to the determination of the first vector representation being more similar to the second vector representation.

7. The computer-implemented method of claim 1, further comprising:
   training a phoneme embedding generator with a plurality of candidate mined pairs excluding the candidate mined pair; and
   generating a first vector representation of the media content using the phoneme embedding generator.

8. The computer-implemented method of claim 7, further comprising:
   generating a second vector representation of the transcription using the phoneme embedding generator;
   determining that the first vector representation is more similar to the second vector representation than vector representations of other media content; and selecting the media content, responsive to the determination of the first vector representation being more similar to the second vector representation.

9. A non-transitory computer-readable medium storing instructions that, when executed by a processor of a first electronic device, cause the first electronic device to perform operations, the operations comprising:
receiving a transcription comprising media content, wherein the transcription is generated via an automatic speech recognition (ASR) engine;
generating a voice graph based at least on previous ASR transcriptions of n-best outputs, where n is an integer, wherein the voice graph comprises n nodes and at least (n−1) edges, wherein a first node of the n nodes corresponds to a top-1 transcript, and an $n^{th}$ node corresponds to a top-n transcript, where n>=2, and wherein an (n−1) edge of the at least (n−1) edges corresponds to the first node and the $n^{th}$ node;
selecting a candidate mined pair based at least on the voice graph, wherein the candidate mined pair comprises a mis-transcription and a correct transcription;
determining that the transcription corresponds to the mis-transcription; and
replacing the transcription with the correct transcription.

10. The non-transitory computer-readable medium of claim 9, wherein the operations further comprise:
training a phoneme embedding generator with a plurality of candidate mined pairs including the candidate mined pair; and
generating a first vector representation of the media content using the phoneme embedding generator.

11. The non-transitory computer-readable medium of claim 10, wherein the operations further comprise:
generating a second vector representation of the transcription using the phoneme embedding generator;
determining that the first vector representation is more similar to the second vector representation than vector representations of other media content; and
selecting the media content, responsive to the determination of the first vector representation being more similar to the second vector representation.

12. The non-transitory computer-readable medium of claim 9, wherein the operations further comprise:
training a phoneme embedding generator with a plurality of candidate mined pairs excluding the candidate mined pair; and
generating a first vector representation of the media content using the phoneme embedding generator.

13. The non-transitory computer-readable medium of claim 12, wherein the operations further comprise:
generating a second vector representation of the transcription using the phoneme embedding generator;
determining that the first vector representation is more similar to the second vector representation than vector representations of other media content; and
selecting the media content, responsive to the determination of the first vector representation being more similar to the second vector representation.

14. A system, comprising:
one or more memories; and
at least one processor each coupled to at least one of the memories and configured to perform operations comprising:
receiving a transcription comprising media content, wherein the transcription is generated via an automatic speech recognition (ASR) engine;
generating a voice graph based at least on previous ASR transcriptions of n-best outputs, where n is an integer, wherein the voice graph comprises n nodes and at least (n−1) edges, wherein a first node of the n nodes corresponds to a top-1 transcript, and an $n^{th}$ node corresponds to a top-n transcript, where n>=2, and wherein an (n−1) edge of the at least (n−1) edges corresponds to the first node and the $n^{th}$ node;
selecting a candidate mined pair based at least on the voice graph, wherein the candidate mined pair comprises a mis-transcription and a correct transcription;
determining that the transcription corresponds to the mis-transcription; and
replacing the transcription with the correct transcription.

15. The system of claim 14, wherein the operations further comprise:
training a phoneme embedding generator with a plurality of candidate mined pairs including the candidate mined pair; and
generating a first vector representation of the media content using the phoneme embedding generator.

16. The system of claim 15, wherein the operations further comprise:
generating a second vector representation of the transcription using the phoneme embedding generator;
determining that the first vector representation is more similar to the second vector representation than vector representations of other media content; and
selecting the media content, responsive to the determination of the first vector representation being more similar to the second vector representation.

17. The system of claim 14, wherein the operations further comprise:
training a phoneme embedding generator with a plurality of candidate mined pairs excluding the candidate mined pair;
generating a first vector representation of the media content using the phoneme embedding generator;
generating a second vector representation of the transcription using the phoneme embedding generator;
determining that the first vector representation is more similar to the second vector representation than vector representations of other media content; and
selecting the media content, responsive to the determination of the first vector representation being more similar to the second vector representation.

18. The system of claim 14, wherein an attribute of the first node comprises: a frequency, a ranking distribution, or an associated entity.

19. The system of claim 14, wherein an attribute of the (n−1) edge comprises: a co-occurrence frequency of the first node and the $n^{th}$ node, and a relatedness score.

20. The system of claim 19, wherein the relatedness score comprises a pointwise mutual information (PMI) score.

* * * * *